(12) United States Patent
Peterson

(10) Patent No.: US 12,059,925 B2
(45) Date of Patent: Aug. 13, 2024

(54) WHEEL ADAPTOR

(71) Applicant: Lynn E. Peterson, Ludington, MI (US)

(72) Inventor: Lynn E. Peterson, Ludington, MI (US)

( * ) Notice: Subject to any disclaimer, the term of this patent is extended or adjusted under 35 U.S.C. 154(b) by 0 days.

(21) Appl. No.: 18/449,398

(22) Filed: Aug. 14, 2023

(65) Prior Publication Data

US 2023/0406035 A1 Dec. 21, 2023

Related U.S. Application Data

(63) Continuation of application No. 16/918,086, filed on Jul. 1, 2020, now Pat. No. 11,760,125.

(51) Int. Cl.
*B60B 3/14* (2006.01)
*B60B 3/16* (2006.01)

(52) U.S. Cl.
CPC .............. *B60B 3/147* (2013.01); *B60B 3/16* (2013.01)

(58) Field of Classification Search
CPC .............. B60B 3/147; B60B 3/16; B60B 3/14
See application file for complete search history.

(56) References Cited

U.S. PATENT DOCUMENTS

| | | | |
|---|---|---|---|
| 2,590,363 | A | 3/1952 | Adair |
| 3,166,357 | A | 1/1965 | Vachon |
| 3,361,482 | A | 1/1968 | Stevens |
| 3,820,851 | A | 6/1974 | Longo |
| 3,834,766 | A | 9/1974 | Thousand |
| 3,869,174 | A | 3/1975 | Brown |
| 3,871,708 | A | 3/1975 | Richter |
| 4,478,081 | A | 10/1984 | Greene |
| 5,362,134 | A | 11/1994 | Carmona |
| D431,513 | S | 10/2000 | Lovitt |
| 6,238,009 | B1 | 5/2001 | Lovitt |
| D445,077 | S | 7/2001 | Lovitt |
| 6,626,502 | B1 | 9/2003 | Petrak |
| D659,624 | S | 5/2012 | Farradas |

(Continued)

FOREIGN PATENT DOCUMENTS

| | | |
|---|---|---|
| GB | 2086317 A | 5/1982 |
| JP | 1629421 S | 4/2019 |
| JP | 1632992 S | 6/2019 |

OTHER PUBLICATIONS

CWA6450-6550B Custom Wheel Adapters 6-Lug Wheel Patterns (Solid) 6x4.5" to 6 x 5.5"or 6 x 5.75", 1.25" thick, ID of 72mm, Stud/Thread size adjustable available at https://4x4.fatbobsgarage.com/custom-wheel-adapters—6-lug-wheel-patterns-sold-individually-p22924.aspx; access on Mar. 21, 2020 Mar. 21, 2020.

(Continued)

*Primary Examiner* — Jason R Bellinger
(74) *Attorney, Agent, or Firm* — McGarry Bair PC

(57) ABSTRACT

A method of modifying a hub with a wheel adaptor. The wheel adaptor includes a cylindrical body, a first set of holes that includes six symmetrically spaced holes located at a first radial distance, a second set of holes that include three holes located at a second radial distance, and a third set of holes that include another three holes located at a third radial distance. The method includes coupling the wheel adaptor to the hub. The coupling includes passing six symmetrically spaced lugs of the hub through the wheel adaptor at the first set of holes and fastening using six hub lug nuts. The method further includes drilling six holes through the hub using the second set of holes and the third set of holes of the wheel adaptor as drilling guides.

20 Claims, 4 Drawing Sheets

(56) References Cited

U.S. PATENT DOCUMENTS

| | | |
|---|---|---|
| D811,977 S | 3/2018 | Oscroft |
| 2019/0039407 A1 | 2/2019 | Smith |

OTHER PUBLICATIONS

Wheel Adapters 6x 5.5" to 5 x 150 available at https://wheeladaptersusa.com/collections/6-to-5-lug/products/6x5-5-to-5x150-hub-centric-wheel-adapter-spacers-12x1-5-threads-2-inch-thick-use-5-lug-tundra-wheels-on-6-lug-chevy-gmc-toyota-trucks Mar. 21, 2020.

Spacer/Adapters 5x5" or 5x4.75" to 5x5" available at https://wheeladaptersusa.com/collections/5-lug-wheel-spacers-adapters/products/2-wheel-spacers-adapters-5x5-or-5x4-75-to-5x5-1-2x20-studs-1-25-universal Mar. 21, 2020.

Customadeonly 2 Pieces 2" 50mm Hub Centric Conversion Wheel Rim Adapters Spacers (Change Bolt Pattern) 5x4.75 to 6x5.5 5x120.7 to 6x139.7 Center Bore 70.3mm to 78.1mm Thread Pitch 12x1.5 available at https://www.amazon.com/Customadeonly-Centric-Conversion-Adapters-Spacers/dp/B06XKKVLPV/ref=sr_1_6?keywords=6x5+to+5x5.5%2F4.75&qid=1584635578&s=automotive&sr=1-6&swrs=10F349C08B18939C8BC1CED535203A28 Mar. 21, 2020.

WHEEL ADAPTOR

CROSS-REFERENCE TO RELATED APPLICATION

This application is a continuation application of U.S. patent application Ser. No. 16/918,086, filed Jul. 1, 2020, now U.S. Pat. No. 11,760,125, issued Sep. 19, 2023, which is hereby incorporated herein by reference in its entirety.

TECHNICAL FIELD

The disclosure generally relates to a wheel adaptor, and more specifically, to a wheel adaptor used to couple a hub to a wheel where the wheel is not sized for attachment to the hub.

BACKGROUND

A wheel adaptor permits the mounting of a wheel or rim onto a hub, where the hub and the wheel have different bolt patterns. The wheel adaptor can be shaped as a right circular hollow cylinder, cylindrical shell, washer, or tube. The wheel adapter can include symmetric holes capable of receiving hub bolts that extend from the hub. The hub bolts are secured to the wheel adaptor using hub lug nuts. The wheel adapter can include adaptor bolts that extend from the wheel adaptor providing a different, but symmetric bolt pattern than the hub. The wheel can then be mounted and secured to the adaptor bolts using lug nuts.

BRIEF DESCRIPTION

Aspects and advantages of the disclosure will be set forth in part in the following description, or may be obvious from the description, or may be learned through practice of the disclosure.

In one aspect, the disclosure relates to a wheel adaptor for coupling a hub to a wheel. The wheel adaptor includes a cylindrical body having first face and second face that define a central axis that is perpendicular to the first face and the second face, a first set of holes extending between the first face and the second face, where the first set of holes include six symmetrically spaced holes located at a first radial distance from the central axis, a second set of holes extending between the first face and the second face, where the second set of holes include three holes located at a second radial distance from the central axis, a third set of holes extending between the first face and the second face, where the third set of holes include another three holes located at a third radial distance from the central axis.

In another aspect, the disclosure relates to a system for adapting a hub for coupling the hub to a wheel where the wheel is not sized for attachment to the hub. The system includes an adaptor for coupling the hub to the wheel via the adaptor. The adaptor includes a body having first face and second face that define a central axis that is perpendicular to the first face and the second face, a first set of holes extending between the first face and the second face, where the first set of holes include six symmetrically spaced holes located at a first radial distance from the central axis, a second set of holes extending between the first face and the second face, where the second set of holes includes three holes located at a second radial distance from the central axis, and a third set of holes extending between the first face and the second face, where the third set of holes includes another three holes located at a third radial distance from the central axis.

DETAILED DESCRIPTION

Figure 1:
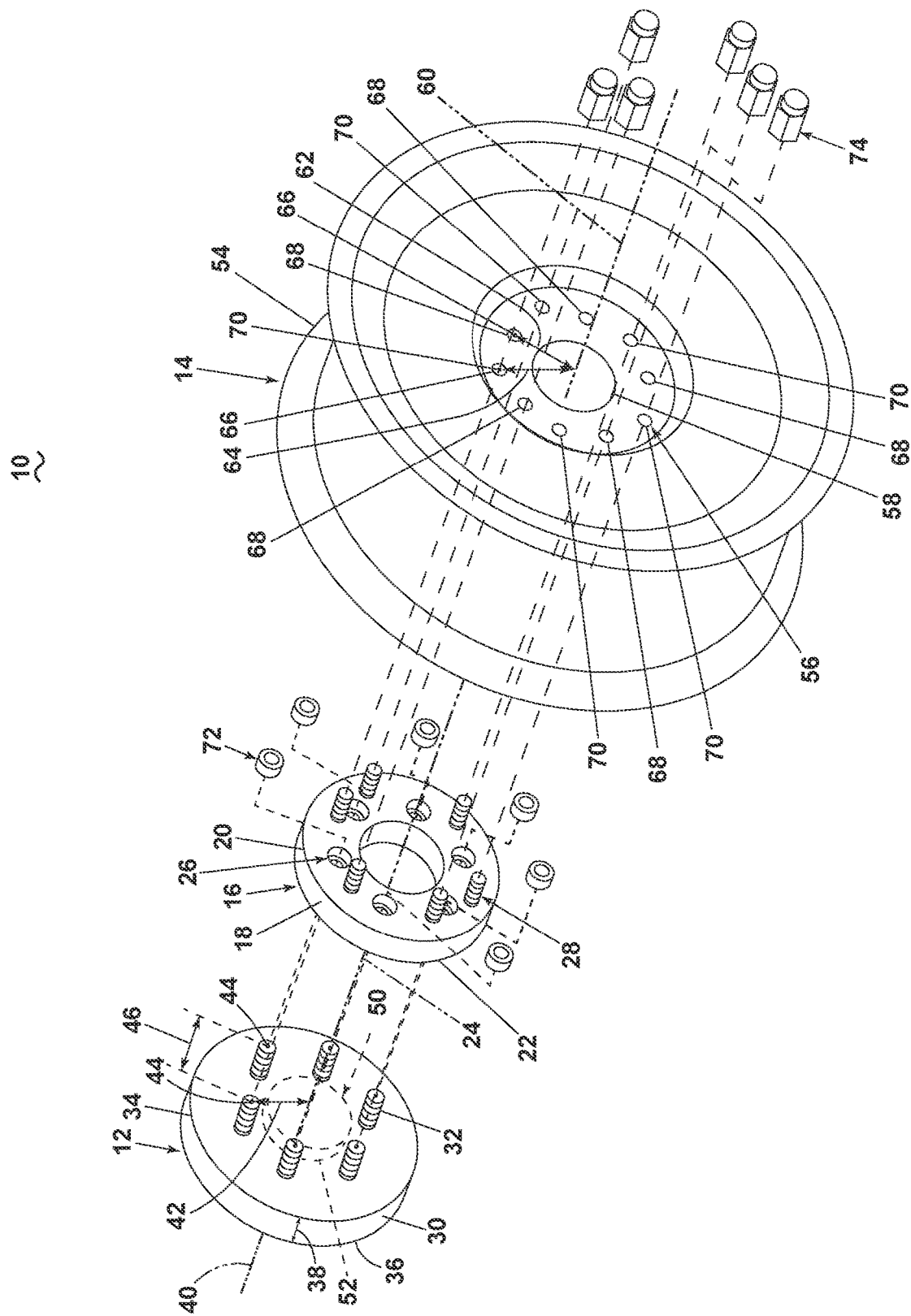
FIG. 1 is a schematic illustration of a system for coupling a wheel to a hub with a wheel adaptor.

Aspects of the disclosure described herein are directed to a wheel adaptor capable of adapting a hub with six lug to a multi-wheel or dual pattern wheel, capable of receiving at least two bolt patterns. Traditionally, wheel adaptors for six lug bolt patterns include multiple plates and only adapt the six lug to a single five bolt pattern. The traditional wheel adaptors can be thick and provide undesirable offset. The wheel adaptor, as disclosed herein, can adapt a six lug hub to a six bolt pattern wherein the six bolts provide portions of two different bolt patterns. That is, the wheel adaptor, as disclosed, can adapt a hub with 6 lugs to a multi-wheel.

The term "multi-wheel" as used herein describes a wheel or rim capable of receiving at least two different bolt patterns, where each of the bolt patterns are reflected as a set of holes. That is, the multi-wheel includes a set of holes for each bolt pattern that can be received by the multi-wheel. By way of non-limiting example, if the multi-wheel was capable of receiving two different five bolt patterns, the multi-wheel would have ten holes; five holes for each of the two patterns.

As used herein, the term "tight fit" refers to negligible clearances between two objects. That is, the diameter of a first object is larger than the diameter of a second object, so that the first object can receive the second object. A tight fit is a traditional engineering fit in which the diameter differences of 5 percent or less provide a negligible clearance so that two objects can fit snugly or securely together while being assembled or disassembled by hand.

As used here, the term "generally equal" refers to two numerical values in which the percent difference between the two values is 5 percent or less.

As used herein, the terms "radial" or "radially" refer to a direction away from a common center. For example, in the overall context of a hub, wheel, or wheel adaptor, radial refers to a direction along a ray extending between a center longitudinal axis of the hub, the wheel, or the wheel adaptor and an outer hub, wheel, or wheel adaptor circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates a system 10 for adapting a hub 12 to a wheel 14, where the hub 12 is not sized for attachment to the wheel 14. The system 10 can include an adaptor or wheel adaptor 16 for coupling the hub 12 to the wheel 14 via the wheel adaptor 16.

The wheel adaptor 16 can include a cylindrical body 18 having first face 20 and second face 22, with the cylindrical body 18 defining a central axis 24. The central axis 24 is perpendicular to the first face 20 and the second face 22.

A first set of holes 26 can extend between the first face 20 and the second face 22. The first set of holes 26 can include six symmetrically spaced holes.

The wheel adaptor can further include 6 six bolts 28. The location of the six bolts 28 and the first set of holes 26 is further discussed in FIG. 2. The six bolts 28 can couple to or be formed with the cylindrical body 18 and extend beyond the first face 20.

The hub 12 can include a hub body 30 and six symmetrically spaced lugs 32. The hub body 30 includes a circular front hub face 34 and a circular rear hub face 36. A hub thickness 38 is defined as the distance between the front hub face 34 and the rear hub face 36. A hub centerline 40 is defined as perpendicular to at least a portion of the front hub face 34 and the rear hub face 36. As illustrated, by way of non-limiting example, the hub centerline 40 can be aligned with the central axis 24 of the wheel adaptor 16.

The six symmetrically spaced lugs 32 can be coupled to or formed integrally with the hub body 30. The lugs 32 extend beyond the front hub face 34 and are parallel to the hub centerline 40. That is, the term "parallel" refers to generally parallel, where a line can be drawn that crosses at least one of the lugs 32 and the hub centerline 40, wherein the line is between 85 degrees and 95 degrees to both the lug 32 and the hub centerline 40.

A lug radial distance 42 can be measured from the hub centerline 40 to a center point 44 of each of the lugs 32. The lug radial distance 42 is measured perpendicular to the hub centerline 40, where the term "perpendicular" refers to generally perpendicular, where the angle between the hub centerline 40 and the lug radial distance 42 is between 85 degrees and 95 degrees. The lug radial distance 42 for each of the six symmetrically spaced lugs 32 is generally equal.

A hub lug spacing 46 can be measured as a straight line between the center points 44 of two adjacent lugs 32. The hub lug spacing 46 between each of the six symmetrically spaced lugs 32 is generally equal. That is the distance between any two adjacent lugs of the six symmetrically spaced lugs 32 will be generally equal. The generally equal hub lug spacing 46 and the generally equal lug radial distance 42 provide the symmetry of the lugs 32.

The hub lug spacing 46 or the lug radial distance 42 can be used to identify a bolt pattern. For example, if the lug radial distance 42 of the lugs 32 is approximately 5.71 centimeters (2.25 inches), then the bolt pattern of the six symmetrically spaced lugs 32 is commonly identified as 6×4.5 inches indicating the center point 44 of two opposite lugs of the six symmetrically spaced lugs 32 are approximately 11.4 centimeters (4.5 inches).

Another non-limiting example can include the lug radial distance 42 of the lugs 32 having a measurement of approximately 6.99 centimeters (2.75 inches). When the lug radial distance 42 is approximately 6.99 centimeters (2.75 inches), then the bolt pattern of the lugs 32 is commonly identified as 6×5.5 inches indicating the center point 44 of two opposite lugs of the lugs 32 are approximately 14.0 centimeters (5.5 inches).

In yet another non-limiting example, if the lug radial distance 42 of the lugs 32 is 6.75 centimeters (approximately 2.66 inches), then the bolt pattern of the lugs 32 is commonly identified as 6×135 millimeter indicating the center point 44 of two opposite lugs of the lugs 32 are 13.5 centimeters (approximately 5.3 inches).

It should be understood that additional radial distances or spacing between lugs 32 is contemplated, and that the invention should not be limited only to the examples provided herein. The examples provided are by way of example only, and one having ordinary skill in the art will appreciate that different sizes and dimensions are possible.

Optionally, a hub flange 50 can extend from the front hub face 34. The hub flange 50 can be a circular cylinder. Alternatively, flange edges 52 can be angled as they extend from the front hub face 34 such that the shape of the hub flange 50 is a frustum. Additionally, or alternatively, the hub flange 50 can include grooves, threads, or other means of coupling to or receiving one or more components such as, but not limited to, a ring.

The hub 12 can include additional structures (not shown) that can, by way of non-limiting example, couple the hub to one or more portions of a vehicle, machine, or other mechanical device for the rotation of the hub 12 about the hub centerline 40.

The wheel 14 can include wheel body 54 capable of receiving a tire (not shown). Alternatively, the wheel body 54 can receive a belt or a track in non-limiting examples. The wheel body 54 has a plurality of receiving holes 56 located about a center bore 58. The center bore 58 can define a wheel centerline 60. The wheel centerline 60 can align with the central axis 24 of the wheel adaptor 16.

At least one of the plurality of receiving holes 56 is spaced by a first wheel distance 62 from the wheel centerline 60 and at least one of the plurality of receiving holes 56 is spaced by a second wheel distance 64 from the wheel centerline 60. The first wheel distance 62 and the second wheel distance 64 are measured from the wheel centerline 60 to a center 66 of the respective hole.

By way of non-limiting example, a first group of five holes 68 of the plurality of receiving holes 56 is located at the first wheel distance 62 and a second group of five holes 70 is located at the second wheel distance 64. The wheel 14 is a multi-pattern wheel, defined by the first wheel distance 62 and the second wheel distance 64, that can receive more than one bolt pattern via multiple groups of holes. Multi-pattern wheels, such as the wheel 14 illustrated in FIG. 1, that are capable of receiving two bolt patterns can be identified as dual pattern wheels. While illustrated as a dual pattern wheel, it is contemplated that the wheel 14 can be any multi-pattern wheel capable of accepting more than two bolt patterns.

The six symmetrically spaced lugs 32 of the hub 12 can be received by the first set of holes 26 of the wheel adaptor 16. Six hub lug nuts 72 can couple the wheel adaptor 16 to the hub 12. That is, when the lugs 32 are received by the first set of holes 26 the hub lug nuts 72 can be threaded to the lugs 32. Optionally, when the wheel adaptor 16 is coupled to the hub 12, the hub lug nuts 72 are received by the wheel adaptor 16 so that the hub lug nuts 72 are located within the cylindrical body 18. That is, when the hub lug nuts 72 are located within the cylindrical body 18, the hub lug nuts 72 can be located between or in alignment with the first face 20 and the second face 22. As used herein, the term "in alignment with the first face 20" refers to at least one portion of the hub lug nuts 72 in the same plane as the first face 20. It is further contemplated that a portion the lugs 32 can be in alignment with the first face 20.

Similarly, six receiving holes of the plurality of receiving holes 56 of the wheel 14 can receive the six bolts 28 of the wheel adaptor 16. Six wheel lug nuts 74 can couple the wheel adaptor 16 to the wheel 14. That is, the six wheel lug nuts 74 can be threaded to the six bolts 28 of the wheel adaptor 16 when the six bolts 28 are received by the six receiving holes of the plurality of receiving holes 56 of the wheel 14. It is further contemplated that the six receiving holes of the wheel 14 that receive the six bolts 28 include three receiving holes from the first group of five holes 68 and three receiving holes from the second group of five holes 70.

Figure 2:
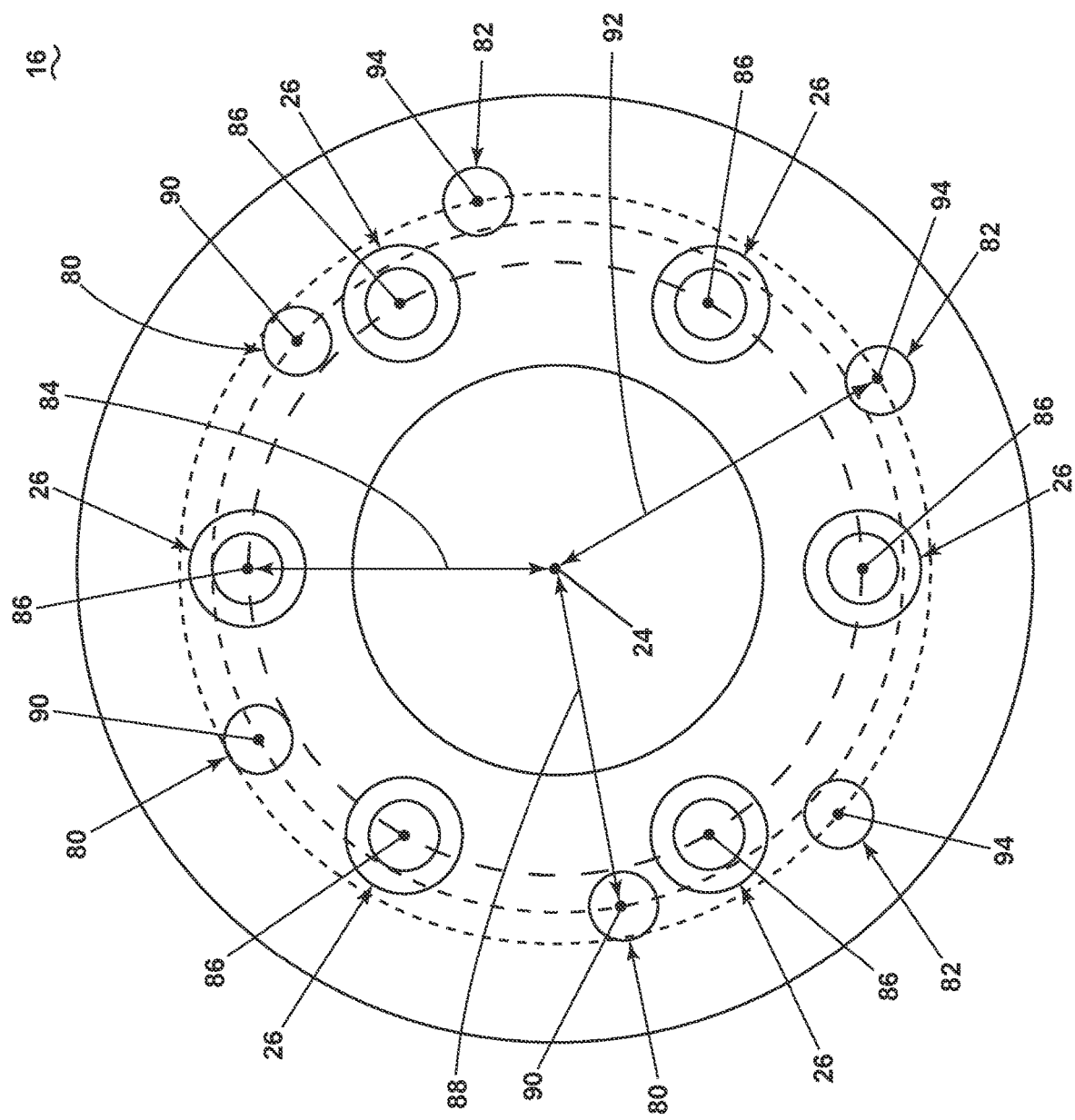
FIG. 2 is a top down schematic view of the wheel adaptor of FIG. 2.

FIG. 2 further illustrates a top view, or a view toward the first face 20 of the wheel adaptor 16. For clarity, the six bolts 28 are not coupled to the wheel adaptor 16. The wheel adaptor 16 includes the first set of holes 26, a second set of holes 80, and a third set of holes 82.

The first set of holes 26 are located at a first radial distance 84 from the central axis 24. The first radial distance 84 can be measured from the central axis 24 to a first center 86 of each of the first set of holes 26. By way of non-limiting example, the first radial distance 84 can be approximately 5.71 centimeters (2.25 inches), 5.75 centimeters (approximately 2.26 inches), 6.00 centimeters (approximately 2.36 inches), 6.60 centimeters (approximately 2.60 inches), 6.75 centimeters (approximately 2.66 inches), or 6.99 centimeters (2.75 inches), however, other sizes are contemplated.

The first radial distance 84 of the first set of holes 26 of the wheel adaptor 16 can be generally equal to the lug radial distance 42. When the first radial distance 84 is generally equal to the lug radial distance 42, the lugs 32 of the hub 12 can be received via a tight fit by the first set of holes 26.

The second set of holes 80 extending between the first face 20 and the second face 22 includes three holes located at a second radial distance 88 from the central axis 24. The second set of holes 80 can receive three of the six bolts 28 from the hub, allowing the three of the six bolts 28 to be coupled to the wheel adaptor 16. Additionally, or alternatively, the three of the six bolts 28 can be formed with the wheel adaptor 16 at the location of the second set of holes 80.

A second center 90 can be defined as the center of each of the second set of holes 80. The second radial distance 88 can be measured from the central axis 24 to the second center 90. By way of non-limiting example, the second radial distance 88 can be approximately 5.71 centimeters (2.25 inches), approximately 6.0 centimeters (2.37 inches), approximately 6.35 centimeters (2.5 inches), or approximately 6.98 centimeters (2.75 inches). The second radial distance 88, being different or dissimilar to the first radial distance 84, can be generally equal to the first wheel distance 62, for example.

The third set of holes 82 extending between the first face 20 and the second face 22, includes three holes located at a third radial distance 92 from the central axis 24. The third set of holes 82 can receive three of the six bolts 28 of the hub 12, allowing the three of the six bolts 28 to be coupled to the wheel adaptor 16. Additionally, or alternatively, the three of the six bolts 28 can be formed with the wheel adaptor 16 at the location of the third set of holes 82.

A third center 94 can be defined as the center of each of the third set of holes 82. The third radial distance 92 can be measured from the central axis 24 to the third center 94.

By way of non-limiting example, the third radial distance 92 can be approximately 5.71 centimeters (2.25 inches), approximately 6.0 centimeters (2.37 inches), approximately 6.35 centimeters (2.5 inches), or approximately 6.98 centimeters (2.75 inches).

The third radial distance 92, being different or dissimilar to the second radial distance 88, can be generally equal to the second wheel distance 64. It is contemplated that the first radial distance, second radial distance, and the third radial distance are dissimilar distances.

Figure 3:
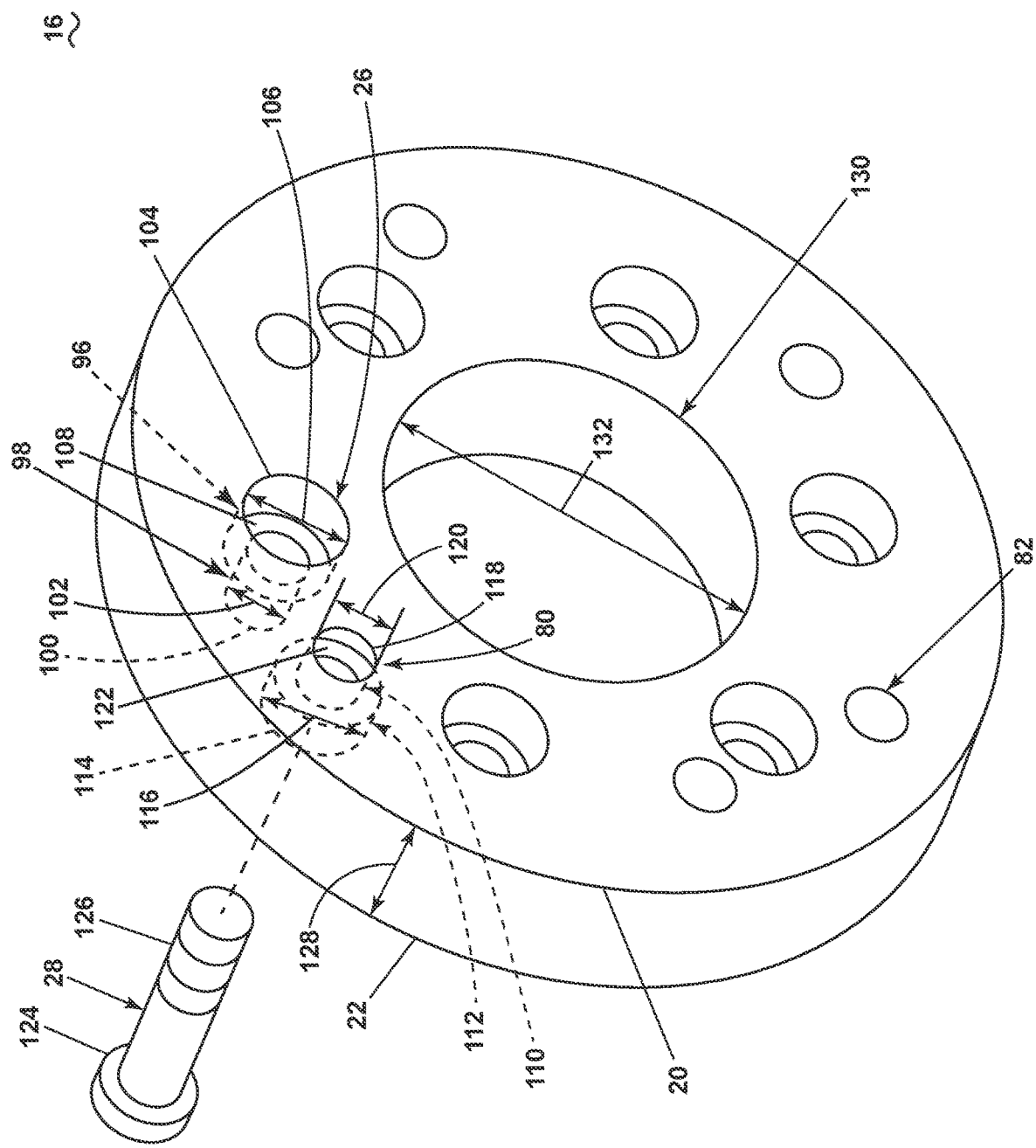
FIG. 3 is a perspective view of the wheel adaptor of FIG. 2.

FIG. 3 is a perspective view of the wheel adaptor 16. Each of the first set of holes 26 includes a first portion 96 and a second portion 98. A lug inlet 100 can be defined by the second portion 98 at the second face 22. A lug inlet diameter 102 can be measured across the second portion 98 at the second face 22.

A lug nut inlet 104 can be defined by first portion 96 at the first face 20. A lug nut inlet diameter 106 can be measured across the first portion 96 at the first face 20. It is contemplated that the lug inlet diameter 102 is smaller than the lug nut inlet diameter 106.

A lug seat 108 can be defined by the intersection of the first portion 96 and the second portion 98. The lug seat 108 can be a surface that is, at least in part, parallel to the first face 20 and the second face 22 and located within the cylindrical body 18 of the wheel adaptor 16.

Each of the second set of holes 80 and the third set of holes 82 include a first section 110 and a second section 112. A bolt inlet 114 can be defined by the second section 112 at the second face 22. A bolt inlet diameter 116 can be measured across the second section 112 at the second face 22.

A bolt outlet 118 can be defined by the first section 110 at the first face 20. A bolt outlet diameter 120 can be measured across the first section 110 at the first face 20. It is contemplated that the bolt inlet diameter 116 is greater than or equal to the bolt outlet diameter 120.

A bolt head seat 122 can be defined by the intersection of the first section 110 and the second section 112. The bolt head seat 122 can be a surface that is parallel to the first face 20 and the second face 22 and located within the cylindrical body 18 of the wheel adaptor 16.

Each of the six bolts 28 can include a head 124 and a threaded portion 126. At least a portion of the head 124 of each of the six bolts 28 can be in contact with the corresponding bolt head seat 122, when the bolt 28 is received by one of the second set of holes 80 or one of the third set of holes 82.

An adaptor thickness 128 can be defined between the first face 20 and the second face 22. The adaptor thickness, by way of non-limiting example, can be approximately 1.58 centimeters (0.62 inches) to approximately 3.17 centimeters (1.25 inches), while different thicknesses are contemplated. The wheel adaptor 16 can further include an inner opening 130 defined by the cylindrical body 18 of the wheel adaptor 16. An inner adaptor diameter 132 can be the diameter of the inner opening 130. While illustrated as uniform, it is contemplated that the inner adaptor diameter 132 of the inner opening 130 can increase or decrease from the first face 20 to the second face 22.

It is contemplated that the cylindrical body 18 of the wheel adaptor 16 can include a first cylindrical body and a second cylindrical body. The combined thickness of the first cylindrical body and the second cylindrical body is less than or equal to approximately 3.81 centimeters (1.50 inches). The first, second, or third sets of holes 26, 80, 82 can be formed in one or more of the first cylindrical body and the second cylindrical body.

The first cylindrical body can be coupled to the hub 12 via the six hub lug nuts 72 prior to coupling to the second cylindrical body. Alternatively, both the first and second cylindrical bodies can receive the lugs 32 of the hub 12 where both the first and second cylindrical bodies are coupled to the hub 12 via the six hub lug nuts 72.

The six bolts 28 can extend from the first cylindrical body or the second cylindrical body. It is further contemplated that a portion of the six bolts 28 can extend from the first cylindrical body through the second cylindrical body, while the remainder of the six bolts 28 extend from the second cylindrical body.

Figure 4:
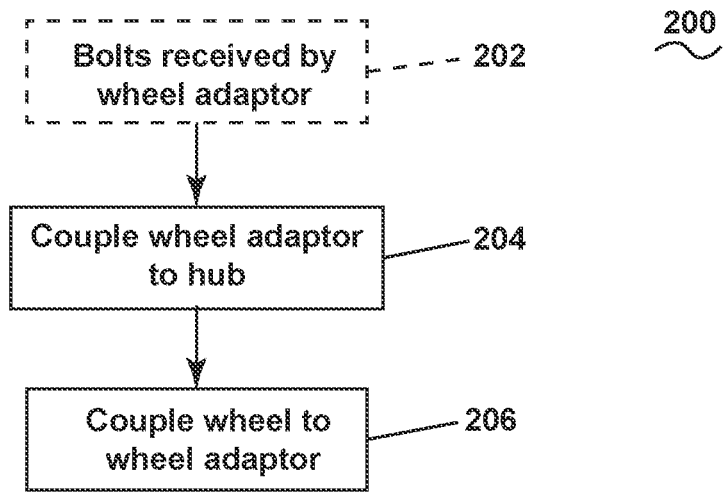
FIG. 4 is a flow chart illustrating a method for coupling the wheel to the hub with the wheel adaptor of FIG. 1.

FIG. 4 illustrates a method 200 for coupling the wheel 14 to the hub 12 with the wheel adaptor 16. Optionally, at 202, the six bolts 28 (FIG. 1) are received by the second set of holes 80 and the third set of holes 82 of the wheel adaptor 16 (FIG. 1). The six bolts 28 can enter the cylindrical body 18 of the wheel adaptor 16 at the bolt inlet 114 on the second face 22. The bolts 28 are threaded through the cylindrical body 18 or pressed through the cylindrical body 18 via a tight fit. The six bolts 28 pass through the cylindrical body 18 until the head 124 of each of the six bolts 28 is in contact with the bolt head seat 122. The head 124 of each of the six bolts 28 can be coupled to or in contact the bolt head seat 122 of each of the second set of holes 80 and the third set of holes 82. Optionally, each head 124 can be fixed, welded, or otherwise secured or mounted to the bolt head seat 122.

The threaded portion 126 can extend, at least in part, through the bolt outlet 118. That is, when the head 124 of each of the six bolts 28 is coupled to or in contact the bolt head seat 122, at least a part of the threaded portion 126 extends beyond the first face 20.

Three of the six bolts 28 passing through, formed with, or otherwise secured to the second set of holes 80 are located at the second radial distance 88. The part of the threaded portion 126 that extends from the first face 20 of the wheel adaptor 16 can form part of a first bolt pattern that is dependent on the second radial distance 88. That is, when the second radial distance 88 is approximately 5.71 centimeters (2.25 inches) the three bolts forming the first bolt pattern are part of a traditionally five bolt pattern commonly identified as 5 by 4.5 inches. When the second radial distance 88 is approximately 6.02 centimeters (2.37 inches) the three bolts forming the first bolt pattern are part of a traditionally five bolt pattern commonly identified as 5 by 4.75 inches. When the second radial distance 88 is approximately 6.35 centimeters (2.5 inches) the three bolts forming the first bolt pattern are part of a traditionally five bolt pattern commonly identified as 5 by 5.0 inches. When the second radial distance 88 is approximately 6.98 centimeters (2.75 inches) the three bolts forming the first bolt pattern are part of a traditionally five bolt pattern commonly identified as 5 by 5.5 inches.

Another three of the six bolts 28 passing through, formed with, or otherwise secured to the third set of holes 82, and extending beyond the first face 20, provide at least a portion of a second bolt pattern. The second bolt pattern is dissimilar or not equal to the first bolt pattern. The second bolt pattern is dependent on the third radial distance 92. That is, when the third radial distance 92 is approximately 5.71 centimeters (2.25 inches) the three bolts forming the second bolt pattern are part of a traditionally five bolt pattern commonly identified as 5 by 4.5 inches. When the third radial distance 92 is approximately 6.02 centimeters (2.37 inches) the three bolts forming the second bolt pattern are part of a traditionally five bolt pattern commonly identified as 5 by 4.75 inches. When the third radial distance 92 is approximately 6.35 centimeters (2.5 inches) the three bolts forming the second bolt pattern are part of a traditionally five bolt pattern commonly identified as 5 by 5.0 inches. When the third radial distance 92 is approximately 6.98 centimeters (2.75 inches) the three bolts forming the second bolt pattern are part of a traditionally five bolt pattern commonly identified as 5 by 5.5 inches.

At 204, the wheel adaptor 16 is coupled to the hub 12. The six symmetrically spaced lugs 32 are received via the lug inlets 100 on the second face 22 of the wheel adaptor 16. The lugs 32, can be received via a tight fit into by the second portion 98 of the first set of holes 26. A portion of the lugs 32 can further extend into the first portion 96 of the first set of holes 26. When the wheel adaptor is mounted or correctly located on the hub 12, the front hub face 34 is in contact with the second face 22 of the wheel adaptor 16. It is contemplated that while a portion of the lugs 32 extend into the first portion 96 of each of the first set of holes 26, the lugs 32 do not extend the full length of the first portion 96. That is, the lugs 32 do not extend past or protrude from first face 20 of the wheel adaptor 16.

Once positioned with the front hub face 34 is in contact with the second face 22 of wheel adaptor 16, the six hub lug nuts 72 can thread over the lugs 32. The hub lug nuts 72 can enter the cylindrical body 18 via the lug nut inlet 104 in the first face 20. The hub lug nuts 72 can continue to thread to the lugs 32 in the first portion 96 of each of the first set of holes 26 until the hub lug nuts 72 contact the lug seat 108. It is contemplated that once the hub lug nuts 72 are in contact with respective lug seats 108, the hub lug nuts 72 do not extend from or protrude beyond the first face 20. That is, when mounted, the hub lug nuts 72 received by the first portion 96 of the first set of holes 26 are threadably coupled to the six symmetrically spaced lugs 32 so that the hub lug nuts 72 are located between the first face 20 and the second face 22 and are in contact with the lug seat 108 defined by the first portion 96 and the second portion 98. Optionally, the hub flange 50 can extend into at least a portion of the inner opening 130 of the wheel adaptor 16 when the wheel adaptor 16 is mounted to the hub 12.

At 206, the wheel 14 is mounted to the wheel adaptor 16. The wheel 14 is positioned on the wheel adaptor 16 so that the six bolts 28 of the wheel adaptor 16 extend through six of the plurality of receiving holes 56 of the wheel 14. At least a portion of the wheel body 54 can be in contact with the first face 20 of the wheel adaptor 16.

Three of the six bolts 28 extend through the first group of five holes 68 and another three of the six bolts 28 extend through the second group of five holes 70. The alignment of the respective three of the six bolts 28 and the first group of five holes 68 or the second group of five holes 70 can result from the general equality of the second radial distance 88 to the first wheel distance 62, while the third radial distance 92 can be generally equal to the second wheel distance 64.

The six bolts 28 couple the wheel adaptor 16 to the wheel 14 and can be secured with six wheel lug nuts 74. The six wheel lug nuts 74 can be threaded to the six bolts 28 that pass through the wheel 14 to bring the first face 20 of the wheel adaptor 16 in contact with the wheel 14.

Figure 5:
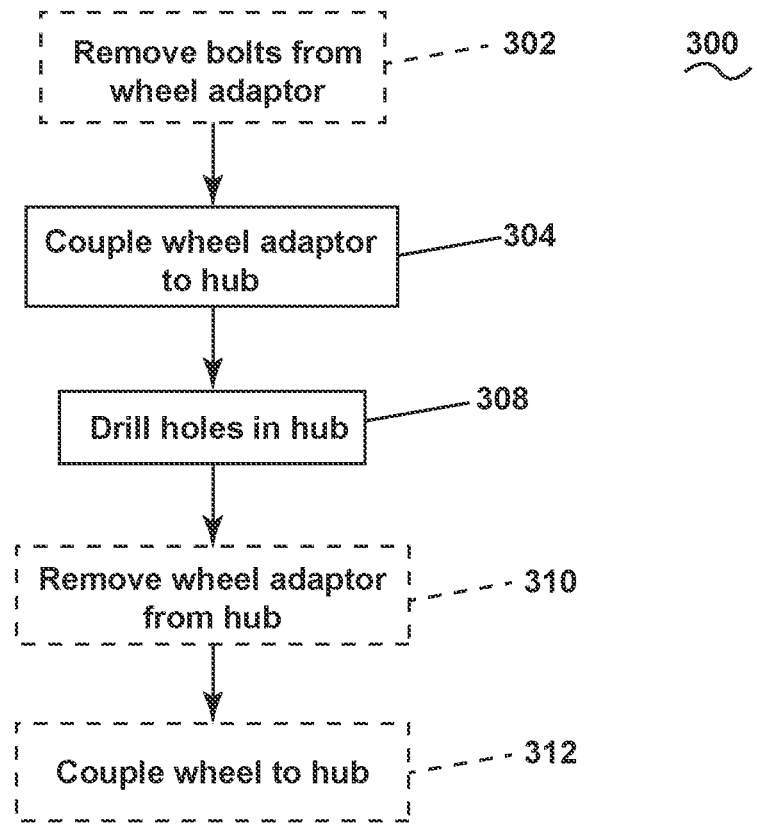
FIG. 5 is a flow chart illustrating a method for modifying a hub with the wheel adaptor of FIG. 3.

FIG. 5 illustrates a method 300 for modifying the hub 12 with the wheel adaptor 16. Optionally, at 302, the six bolts 28 are removed from the wheel adaptor 16, fully exposing the second set of holes 80 and the third set of holes 82.

At 304, the wheel adaptor 16 is coupled to the hub 12 as the six symmetrically spaced lugs 32 are received via the lug inlets 100 on the second face 22 of the wheel adaptor 16. The lugs 32, can be received via a tight fit into by the second portion 98 of the first set of holes 26. A portion of the lugs 32 can further extend into the first portion 96 of the first set of holes 26. When the wheel adaptor is mounted or correctly located on the hub 12, the front hub face 34 is in contact with the second face 22 of the wheel adaptor 16.

Once positioned with the front hub face 34 is in contact with the second face 22 of wheel adaptor 16, the hub lug nuts 72 can thread over the lugs 32. The hub lug nuts 72 can enter the cylindrical body 18 via the lug nut inlet 104 in the first face 20. The hub lug nuts 72 can continue to thread to the lugs 32 in the first portion 96 of each of the first set of holes 26 until the hub lug nuts 72 contact the lug seat 108. That is, when mounted, the hub lug nuts 72 received by the first portion 96 of the first set of holes 26 are threadably coupled to the six symmetrically spaced lugs 32 so that the hub lug nuts 72 are in contact with the lug seat 108 defined by the first portion 96 and the second portion 98.

Optionally, the hub flange 50 can extend into at least a portion of the inner opening 130 of the wheel adaptor 16 when the wheel adaptor 16 is mounted to the hub 12.

At 308, the second set of holes 80 and the third set of holes 82 define drilling guides for drilling holes into the hub 12. That is, a user, can drill holes through the hub 12 at the locations of the second set of holes 80 and the third set of holes 82.

Optionally, at 310, the wheel adaptor 16 can be removed from the hub 12 once six holes are drilled through the hub 12 at the location of the second set of holes 80 and the third set of holes 82. It is contemplated that the six symmetrically spaced lugs 32 can be removed or cut from the hub 12. It is further contemplated that six bolts can be received by the six holes in the hub 12 drilled at the location of the second set of holes 80 and the third set of holes 82.

Optionally, at 312, the wheel 14 can be mounted to the hub 12. The six bolts received by the six holes in the hub 12 can be received by six of the plurality of receiving holes 56 of the wheel 14. The six wheel lug nuts 74 can then be used to secure the wheel 14 to the hub 12.

Benefits of aspects of the disclosure include the single cylindrical body of the wheel adaptor. The wheel adaptor, as described herein, uses one cylindrical body. This provides a more secure connection between the hub and the wheel.

Additional benefits include the attachment of the wheel to the wheel adaptor using six bolts. Traditionally, wheel adaptors that transition a six lug hub to a single five bolt pattern use five bolts to secure the wheel. The wheel adaptor, as disclosed herein, proves a more secure connection from the hub to the wheel by providing six bolts in which to fix the wheel to the wheel adaptor.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of modifying a hub with a wheel adaptor comprising a cylindrical body having first face and second face that define a central axis that is perpendicular to the first face and the second face, a first set of holes extending between the first face and the second face, wherein the first set of holes include six symmetrically spaced holes located at a first radial distance from the central axis, a second set of holes extending between the first face and the second face, wherein the second set of holes include three holes located at a second radial distance from the central axis, wherein the second radial distance is different than the first radial distance, and a third set of holes extending between the first face and the second face, wherein the third set of holes include another three holes located at a third radial distance from the central axis, wherein the third radial distance is different than the second radial distance and the first radial distance, the method comprising:

coupling the wheel adaptor to the hub by passing six symmetrically spaced lugs of the hub from the second face to the first face through the first set of holes of the wheel adaptor, wherein the six symmetrically spaced lugs are secured to the hub with six hub lug nuts at the first face of the wheel adaptor; and drilling six holes through the hub from a front hub face to a rear hub face using the second set of holes and the third set of holes of the wheel adaptor as drilling guides.

2. The method of claim 1, wherein the first radial distance is at least one of approximately 5.71 centimeters (2.25 inches), 5.75 centimeters (approximately 2.26 inches), 6.00 centimeters (approximately 2.36 inches), 6.60 centimeters (approximately 2.60 inches), 6.75 centimeters (approximately 2.66 inches), or approximately 6.98 centimeters (2.75 inches).

3. The method of claim 2, wherein the second radial distance is at least one of approximately 5.71 centimeters (2.25 inches), approximately 6.02 centimeters (2.37 inches), approximately 6.35 centimeters (2.5 inches), or approximately 6.98 centimeters (2.75 inches).

4. The method of claim 3, wherein the third radial distance is at least one of approximately 5.71 centimeters (2.25 inches), approximately 6.02 centimeters (2.37 inches), approximately 6.35 centimeters (2.5 inches), or approximately 6.98 centimeters (2.75 inches).

5. The method of claim 1, wherein the coupling the wheel adaptor to the hub includes contacting the second face of the wheel adaptor and a front hub face of the hub.

6. The method of claim 1, further comprising, after the drilling the six holes in the hub at the location of the second set of holes and the third set of holes, removing the wheel adaptor from the hub.

7. The method of claim 6, further comprising, after removing the wheel adaptor, removing the six symmetrically spaced lugs from the hub.

8. The method of claim 7, further comprising, after removing the six symmetrically spaced lugs from the hub, receiving, at the six holes in the hub drilled at the second set of holes and the third set of holes of the wheel adaptor, six fasteners, wherein the six fasteners extend through the hub and extend way from the front hub face.

9. The method of claim 8, further comprising coupling, after receiving six fasteners that extend from the front hub face, the hub and the wheel using the six bolts, wherein the six bolts further extend through a plurality of receiving holes of a wheel, and wherein the hub and the wheel are secured by six lug nuts at an outside surface of the wheel.

10. The method of claim 9, wherein, when the hub and the wheel are coupled, the front hub face is in contact with an inside surface of the wheel.

11. The method of claim 1, wherein the first set of holes provide a bolt pattern of 6×5.5", the second set of holes provide a portion of a bolt pattern whose dimension is 5×4.5", and the third set of holes provide a portion of a bolt pattern whose dimension is 5×4.75".

12. A method of modifying a hub to receive a multi-pattern wheel with a wheel adaptor, the method comprising:
receiving six symmetrically spaced hub lugs at a first set of holes in the wheel adaptor, wherein the wheel adaptor comprises:
a body having first face and second face that define a central axis that is perpendicular to the first face and the second face, wherein the first set of holes extend between the first face and the second face, and wherein the first set of holes include six symmetrically spaced holes located at a first radial distance from the central axis;
a second set of holes extending between the first face and the second face, wherein the second set of holes include three holes located at a second radial distance from the central axis;
a third set of holes extending between the first face and the second face, wherein the third set of holes include another three holes located at a third radial distance from the central axis, wherein the first radial distance, the second radial distance and the third radial distance are dissimilar;
coupling the wheel adaptor to the hub, wherein the coupling includes threading six hub lug nuts at the first face of the wheel adaptor about the six symmetrically spaced hub lugs;
drilling, using the second set of holes and the third set of holes of the wheel adaptor as drilling guides, six holes from a front hub face to a rear hub face; and
removing, after the drilling the six holes, the wheel adaptor and the six symmetrically spaced hub lugs.

13. The method of claim 12, further comprising coupling, after removing the wheel adaptor and the six symmetrically spaced hub lugs, the multi-pattern wheel to the hub using fasteners located at the six holes drilled in the hub.

14. The method of claim 12, wherein the first radial distance is at least one of approximately 5.71 centimeters (2.25 inches), 5.75 centimeters (approximately 2.26 inches), 6.00 centimeters (approximately 2.36 inches), 6.60 centimeters (approximately 2.60 inches), 6.75 centimeters (approximately 2.66 inches), or approximately 6.98 centimeters (2.75 inches).

15. The method of claim 14, wherein the second radial distance is at least one of approximately 5.71 centimeters (2.25 inches), approximately 6.02 centimeters (2.37 inches), approximately 6.35 centimeters (2.5 inches), or approximately 6.98 centimeters (2.75 inches).

16. The method of claim 15, wherein the third radial distance is at least one of approximately 5.71 centimeters (2.25 inches), approximately 6.02 centimeters (2.37 inches), approximately 6.35 centimeters (2.5 inches), or approximately 6.98 centimeters (2.75 inches).

17. The method of claim 12, wherein the first set of holes provide a bolt pattern of 6×5.5", the second set of holes provide a portion of a bolt pattern whose dimension is 5×4.5", and the third set of holes provide a portion of a bolt pattern whose dimension is 5×4.75".

18. The method of claim 12, wherein the threading six hub lug nuts at the second face of the wheel adaptor includes threading the six hub lug nuts on the six symmetrically spaced hub lugs into the body of the wheel adaptor until each nut of the six hub lug nuts contacts a lug seat within the body of the wheel adaptor.

19. The method of claim 12, wherein the removing the six symmetrically spaced hub lugs includes cutting the six symmetrically spaced hub lugs from the hub, such that no portion of the six symmetrically spaced hub lugs extend past the front hub face.

20. The method of claim 12, wherein, when the hub and the multi-pattern wheel are coupled, the front hub face is on contact with an inside surface of the multi-pattern wheel.

* * * * *